May 7, 1957 W. I. PIXLEY 2,791,260
GUIDE MEANS FOR ROLL STRAIGHTENERS
Filed April 21, 1954 3 Sheets-Sheet 2

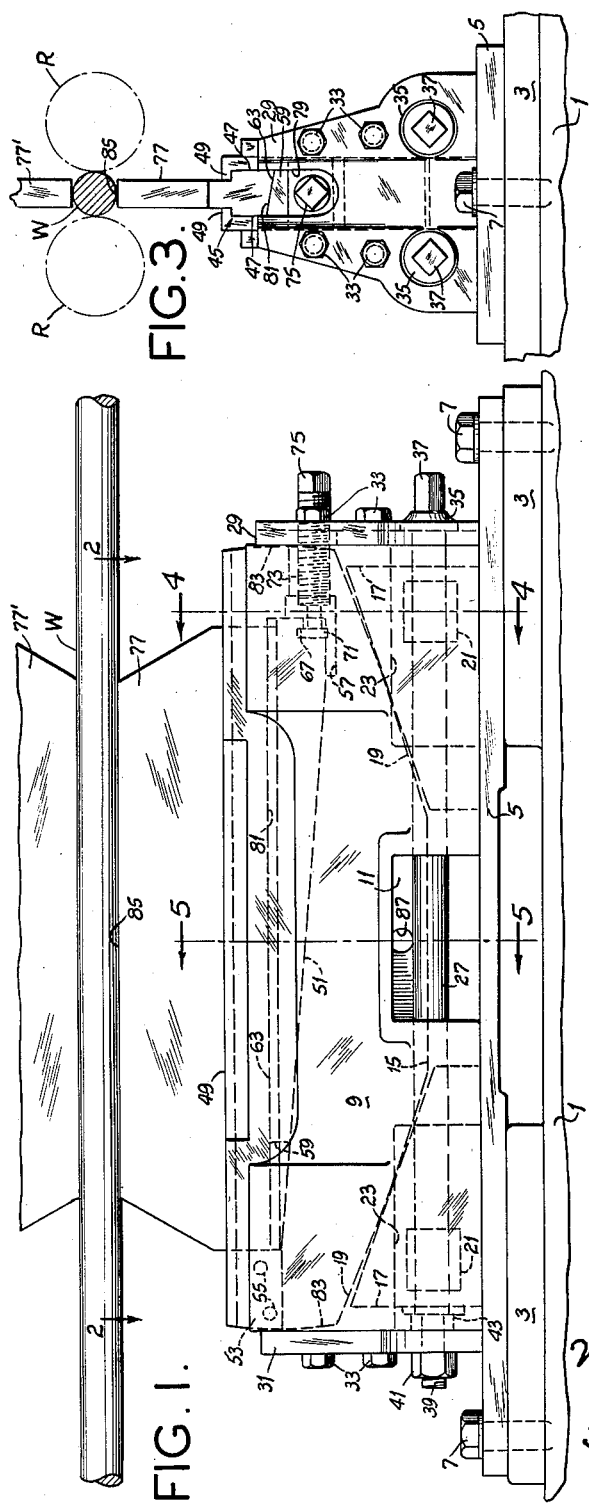

William I. Pixley,
Inventor.
Koenig and Pope,
Attorneys.

May 7, 1957 W. I. PIXLEY 2,791,260
GUIDE MEANS FOR ROLL STRAIGHTENERS
Filed April 21, 1954 3 Sheets-Sheet 3
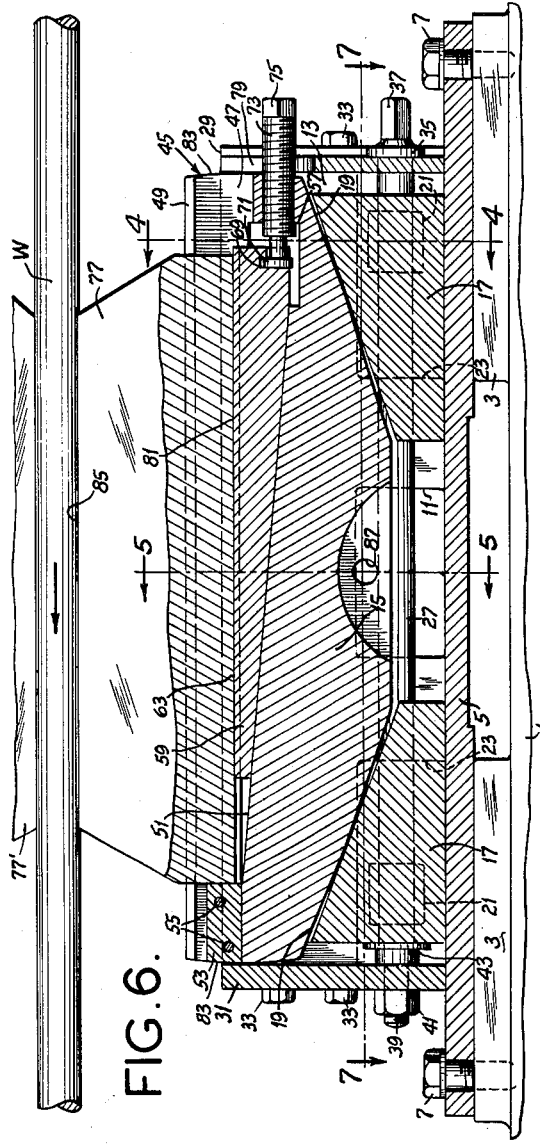

United States Patent Office 2,791,260
Patented May 7, 1957

2,791,260

GUIDE MEANS FOR ROLL STRAIGHTENERS

William I. Pixley, Huntleigh Village, Mo.

Application April 21, 1954, Serial No. 424,711

6 Claims. (Cl. 153—54)

This invention relates to guide means for roll straighteners and more particularly to an adjustable guide and guide holder of this class.

Among the several objects of the invention may be noted the provision of a guide and guide holder for roll straightening machines which avoid the necessity for the former costly double-tapered slot and wedge construction; the provision in a guide holder of the class described of a wedge construction adapted more accurately to position the guide member; and the provision of apparatus of the class described which is more convenient to adjust into proper operating relation to the roll straightener which it serves. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a side elevation of my new guide holder, showing its application to a workpiece;

Fig. 2 is a plan, viewed from line 2—2 of Fig. 1 located just below a workpiece;

Fig. 3 is a right-end view of Fig. 1;

Fig. 6 is a longitudinal vertical section taken on line 6—6 of Fig. 2;

Fig. 7 is a horizontal section taken on line 7—7 of Fig. 6;

Fig. 8 is a left-end view of Fig. 6; and,

Corresponding reference characters indicate corresponding parts throughout the several views of the drawings.

Figure 4:
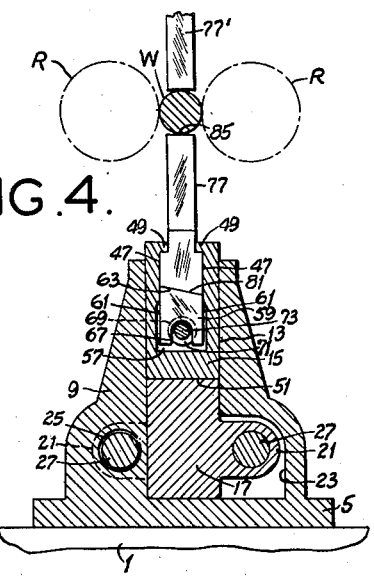
Fig. 4 is a vertical cross section taken on lines 4—4 of Figs. 1 and 6.
Figure 5:
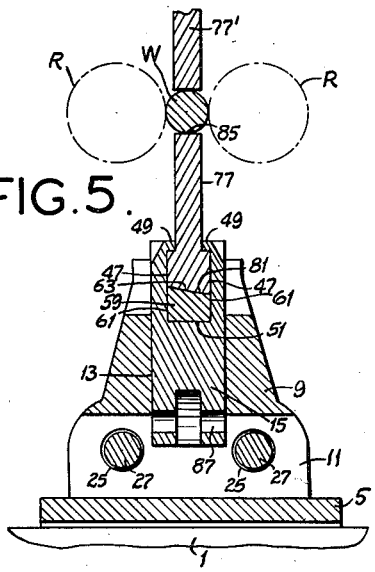
Fig. 5 is a vertical cross section taken on lines 5—5 of Figs. 1 and 6.

Referring now more particularly to the drawings, numeral 1 indicates a roll straightener bed having pads 3 for supporting a base portion 5 of the guide holder. The base is adjustably held in place on the pads by bolt and slot combinations 7. Projecting up from the base 5 is a body 9, forming an arch as shown at 11 and longitudinally bifurcated as at 13. The bifurcation is for the reception of a guide holder 15 and adjusting wedges 17. The guide holder has endwise beveled portions 19 resting on the wedges. Each wedge 17 carries a lateral lug 21 housed in an accommodating recess 23 of the body 9. Suitable openings 25 in the body 9 with clearance receive adjusting bolts 27. In the regions of the recesses 23 these bolts 27 are threaded through the lugs 21. The body 9 has end enclosure plates 29 and 31, held thereto by bolts 33. The bolts 27 have rotary shoulder portions 35 in plate 29, including wrench-engaging parts 37. At their other ends, reduced threaded portions 39 of the bolts pass through the plate 31 (without being threaded thereto) and are provided with threaded nuts 41. The bolts 27 carry washers 43 behind the plate 31. By loosening the nuts 41, the bolts 27 may be rotated by a wrench applied at portions 37. The bolts then rotate without axial movement and drive the wedges 17 axially in the bifurcation 13 for adjustably raising, lowering and leveling the guide holder 15. The engaging surfaces between the wedges 17 and beveled portions 19 are not collinear, as indicated, so that rocking as well as parallel adjustments may be effected upon the guide holder 15 by the wedges 17. After an adjustment, the bolts 41 are tightened by drawing up nuts 41.

The guide holder 15 has flat sides engaging the flat sides of the bifurcation 13. Its upper margin is longitudinally slotted, as indicated in general at 45. The slot 45 is undercut and has flat sides or walls 47 beneath inwardly directed upper lips 49, and has a sloping or tapered bottom 51. At its shallow end the slot 45 is provided with a filler block 53, held in place by bolts 55. At its deep end the slot 45 is provided with a pocket 57.

Figure 9:
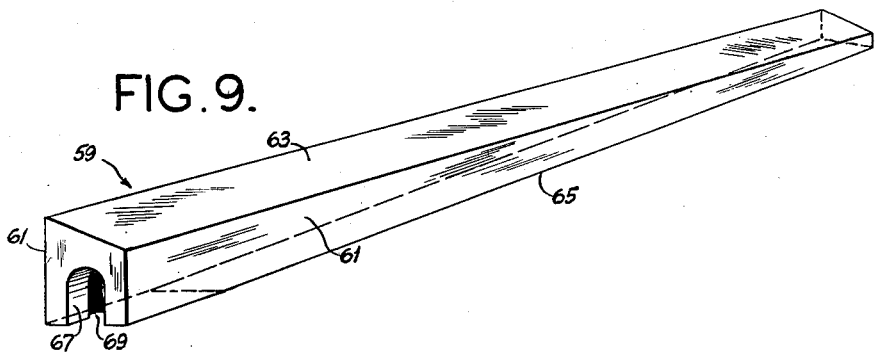
Fig. 9 is an isometric view of a wedge member.

In the bottom of the slot 45 is a taper-bottomed wedge 59 (Fig. 9) having parallel flat sides 61 and, if desired and as shown, a laterally sloping top 63. The wedge has an end opening 67 with an enlarged recess 69 for receiving the stepped head 71 of a mushroom head of a screw 73. The screw is threaded through the end of the body 15. A wrench-engaging portion 75 provides means for adjusting the screw 73 and thereby adjusting the longitudinal position of the wedge 59 in the slot 45. A vertical slots 79 in the end plate 29 accommodates various positions assumed by the screw 73 as the guide holder 15 is adjusted by the wedges 17.

At 77 is shown a guide plate for the workpiece W. The bottom 81 of plate 77 is laterally sloped for engaging laterally sloped top 63 of the wedge 59. The thickness of the plate 77 below the upper lips 49 equals the width of the inside of the slot 45. The upper part of the plate 77 is of a width equalling that between the lips 49. Thus when the wedge 59 is driven back by adjustment from screw 73, the guide plate 77 first engages the block 55 and is then pushed up to lock against the lips 49. The laterally sloping contact between plate 77 and wedge 59 results in pushing the plate sidewise for accurate alignment against one side wall 47. But it will be understood that, if desired, the contact 63, 81 may be normal to the plane of the plate 77, instead of sloping, as shown.

Preferably, as indicated at 83, the ends of the guide holder 15 are rounded so that if the guide holder is given a rocking adjustment by wedges 17, interference with the end plates 29 and 31 is avoided. The end plates maintain the longitudinal position of the guide holder 15 under adjustment from the wedges 17.

In operation, the guide holder 77 is inserted axially into the open end of the slot 45 when the wedge 59 is drawn forward and loose. The wedge 59 is then driven back and tightened by the screw 73. Since the screw 73 extends out through the slot 79 in plate 29 the head 75 map be reached at all times for adjustment. Adjustments are also made at the wedges 17, so as to bring the upper edge 85 of the guide plate 77 into the alignment desired for guiding the workpiece W.

The arrangement described is shown as positioned below the workpiece W, but the same arrangement may be inverted and used above the workpiece, as suggested by the partial showing of an upper guide plate 77'. In order that the guide holder 15 will not fall out from its bifurcation 13 upon inversion, it is provided with an opening 87 into which an anchor bolt may be inserted to be spring supported from member 5 when inverted, without interfering with adjustments of the guide holder 15 from wedges 17. The details of such support are not shown, being known and forming no part of the invention.

The relationship between guide plates 77, 77' and workpiece W is shown in the drawings. In Figs. 3, 4, 5 and 8 the dash circles R schematically indicate the relationship of certain mid roll sections to the workpiece W and the guide plates 77, 77'.

The invention has advantages over prior constructions for the purpose. Formerly the holding arrangement between a guide plate such as 77 and the guide such as 15 was accomplished by an integral dovetailed lower margin on the plate. This dovetail had compound tapering sides and a flat bottom. To place the guide plate it was hammered into wedging position. This not only made the axial position of the guide plate to some extent indeterminate, but called for very complicated machining on the guide plate and holder in forming the compound tapers. In the case of the present construction, the guide plate, holder and wedge may be easily machined.

In addition, the operation of the wedge on the guide plate in connection with the filler block 53 positively predetermines the longitudinal position of the guide plate in the position at which it is intended to be tightened. Moreover, the tightening action is conveniently effected by means of the screw 73, the accessible head 75 of which can be reached readily for manipulation from the end of the device. This is because the screw extends through the slot 79 in the end plate 29. The head 75 is also located at the same point at which adjustments are made upon the heads 37. The slot 79 permits free lateral movements of the screw 73 as the assembly of the holder, guide and wedge is adjusted from wedges 17.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. The improvement in guide means for roll straighteners, said means having a longitudinally bifurcated body and end closure plates, a guide holder in the bifurcation having opposed lower wedge faces and opposed screw-operated first and second wedges therein located below the holder and adapted movably to engage said wedge faces for adjustably raising, lowering and angling the guide holder; comprising an undercut tapered-bottom longitudinal channel in the holder for interlockingly receiving a guide plate, means at one end of said channel for abutment by said guide plate, a third tapered wedge in said tapered-bottom channel, said wedge having flat sides engaging with the flat sides of said channel, the upper face of the wedge engaging said guide plate, and an adjusting screw threaded into said guide holder and having a rotary axially driving connection with said wedge.

2. The improvement in guide means for roll straighteners, said means having a longitudinally bifurcated body and end closure plates, a guide holder in the bifurcation having opposed lower wedge faces and opposed screw-operated first and second wedges therein located below the holder and adapted movably to engage said wedge faces for adjustably raising, lowering and angling the guide holder; comprising a flat-sided and tapered-bottom undercut longitudinal channel in the holder adapted slidingly and interlockingly to receive a guide plate, a filler block at one end of said channel for abutment by said guide plate adapted to limit its longitudinal movement, a bottom tapered third wedge in said tapered-bottom channel, said wedge having flat sides engaging with the flat sides of said channel, the upper face of the wedge engaging said guide plate along a laterally sloping surface, and an adjusting screw threaded into said guide holder and having a rotary axially driving connection with said wedge.

3. The improvement in guide means according to claim 1, wherein one of said end closure plates contains a slot through which extends said adjusting screw permitting movement of the screw crosswise of its axis when the position of said guide holder is adjusted from the wedges.

4. The improvement in guide means according to claim 2, wherein one of said end closure plates contains a vertical slot through which said adjusting screw extends longitudinally permitting movement of the screw crosswise of its axis when the position of said guide holder is adjusted from the wedges and whereby free exterior access may be had to said screw for turning it.

5. The improvement in guide means according to claim 3, wherein said guide holder contains a pocket accommodating said driving connection between the screw and the third wedge.

6. The improvement in guide means made according to claim 4, wherein said guide holder contains a pocket accommodating said driving connection between the screw and the third wedge.

References Cited in the file of this patent
UNITED STATES PATENTS

| | | |
|---|---|---|
| 558,591 | Medart | Apr. 21, 1896 |
| 1,881,869 | Nelson | Oct. 11, 1932 |
| 2,330,551 | Brennan | Sept. 28, 1943 |